US009811198B2

United States Patent
Lee

(10) Patent No.: US 9,811,198 B2
(45) Date of Patent: **\*Nov. 7, 2017**

(54) REFRESHING METHOD OF BACKGROUND SIGNAL AND DEVICE FOR APPLYING THE METHOD

(71) Applicants: SALT INTERNATIONAL CORP., New Taipei (TW); IMAGINATION BROADWAY LTD., New Taipei (TW)

(72) Inventor: Shang-Li Lee, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 172 days.

This patent is subject to a terminal disclaimer.

(21) Appl. No.: 14/747,361

(22) Filed: Jun. 23, 2015

(65) Prior Publication Data

US 2016/0170551 A1 Jun. 16, 2016

(30) Foreign Application Priority Data

Dec. 15, 2014 (TW) .............................. 103143748 A
Dec. 15, 2014 (TW) .............................. 103143749 A

(51) Int. Cl.
G06F 3/044 (2006.01)
G06F 3/041 (2006.01)
G06F 3/0488 (2013.01)

(52) U.S. Cl.
CPC ............ *G06F 3/0416* (2013.01); *G06F 3/044* (2013.01); *G06F 3/0488* (2013.01)

(58) Field of Classification Search
CPC ....... G06F 3/0416; G06F 3/044; G06F 3/0488
See application file for complete search history.

(56) References Cited

U.S. PATENT DOCUMENTS

2009/0251434 A1\* 10/2009 Rimon ...................... G06F 1/30
345/173
2010/0253638 A1\* 10/2010 Yousefpor ............. G06F 3/0412
345/173

(Continued)

FOREIGN PATENT DOCUMENTS

CN 102096530 B 9/2013
CN 102341766 B 9/2014

(Continued)

*Primary Examiner* — Ricardo L Osorio
(74) *Attorney, Agent, or Firm* — Hauptman Ham, LLP

(57) ABSTRACT

A refreshing method of background signal for a device includes: obtaining one or more touched coordinate pair; obtaining a refreshing area according to the touched coordinate pair, an extension parameter, and a measuring breadth; and refreshing a background signal of the refreshing area. The refreshing area is determined by extending a distance of measuring breadth from a center point corresponding to the touched coordinate pair along the orthogonal directions. Accordingly, the refreshing area is sufficient to address the situation where the user draws a line continuously from the touched coordinate pair if the measuring breadth is determined properly. Therefore, the method may satisfy the needs of the user and reduce the refreshing time of an active area of the device. In addition, a device for applying the method is provided as well.

26 Claims, 8 Drawing Sheets

(56) References Cited

U.S. PATENT DOCUMENTS

2014/0055400 A1* 2/2014 Reuschel ............... G06F 3/041
                                                    345/173
2014/0285469 A1   9/2014 Wright et al.
2016/0170550 A1*  6/2016 Lee ....................... G06F 3/0416
                                                    345/174

FOREIGN PATENT DOCUMENTS

| | | |
|---|---|---|
| TW | 201042514   | 12/2010 |
| TW | 201211869   | 3/2012  |
| TW | 201224850   | 6/2012  |
| TW | 201229876   | 7/2012  |
| TW | 201303683 A | 1/2013  |
| TW | 201333754 A | 8/2013  |
| TW | 201444345 A | 11/2014 |

* cited by examiner

REFRESHING METHOD OF BACKGROUND SIGNAL AND DEVICE FOR APPLYING THE METHOD

CROSS-REFERENCES TO RELATED APPLICATIONS

This non-provisional application claims priority under 35 U.S.C. §119(a) on Patent Application No. 103143749 and 103143748, filed in Taiwan, R.O.C. on 2014 Dec. 15, the entire contents of which are hereby incorporated by reference.

This application is related to U.S. application Ser. No. 14/747,165 filed on Jun. 23, 2015, entitled "REFRESHING METHOD OF BACKGROUND SIGNAL AND DEVICE FOR APPLYING THE METHOD", with an inventor LEE, SHANG-LI, that is being filed on the same day as the present application.

BACKGROUND

Technical Field

The instant disclosure relates to a refreshing method of background signal and a sensing device using the same, in particular, to a refreshing method of background signal for touch tracking and a sensing device for using the same.

Related Art

In the history of touch screen technology, the advancement from single point to multi-point touch sensing and touch tracking have always been the focuses of technological breakthroughs.

In recent periods, most of the touch screens for multi-point touch sensing and tracking of multiple touch points utilize the capacitive touch sensing system. This type of system relies on self-capacitance and/or mutual capacitance sensing methods to determine if the touch screen has been touched by the user. During the sensing period, when the controller of the sensing system has detected a change in capacitance for a particular location, the location is determined to have been touched by the user. Therefore, when the sensing system is in operation, each of the position coordinates is stored with its respective predetermined capacitance value (non-contact capacitance value). By this method, a comparison between the new capacitance value and the predetermined value can be done to determine if any position has been touched by the user.

SUMMARY

Since the aforementioned capacitance values are coordinate dependent, as the touch screen achieves higher resolution, the required memory space also increases. In addition, since the predetermined capacitance values are updated continuously, the required computation time for updating will increase as well. As a consequence, the resulting sensitivity and real-time characteristics will be less satisfied. For instance, when a user intends to draw a continuous line, breaks would appear very frequently. The sensing system would also experience trouble in catching up to the drawing speed of the user.

In view of the foregoing issues, the instant disclosure provides a refreshing method of background signal and a sensing device for using the method. When put in use, the refreshing method and the sensing device can effectively refresh the background signals to better identify and track the drawing motion from the user.

The provided refreshing method is applicable to a sensing device capable of obtaining positional information. The method comprises the steps of: obtaining the positional information; obtaining a refreshing area based on the positional information, an extension parameter, and a measuring breadth; and refreshing a background signal of the refreshing area.

In one embodiment, the positional information is multiple touched points. The refreshing area is obtained by: obtaining the extension parameter; defining a plurality of extended areas based on the touched points as center points, the extension parameter, and the measuring breadth; defining overlapped extended areas as an expansion area; and designating the expansion area and any non-overlapping extended area as the refreshing area.

The expanded area is defined by the maximum and minimum coordinates in the horizontal and vertical directions of the overlapping extended areas.

In another embodiment, once the positional information is known, the refreshing area is obtained by the following steps: extending in both positive and negative directions horizontally and vertically from the center (touched) point by the measuring breadth to define an extended area; and designating the extended area as the refreshing area.

Accordingly, the measuring breadth is obtained by dividing a predetermined movement speed by a measuring sampling rate.

In one aspect, the predetermined movement speed is in the range of 50 to 90 cm/s.

In one embodiment, prior to obtaining the positional information, a sensing area of the sensing device is activated and detected (by scanning).

According to one embodiment, when the sensing device is in a standby mode, the extended areas, which are based on touched points as center points, the extension parameter, and the measuring breadth, are defined by extending from respective center points by a distance of the measuring breadth in both positive and negative directions horizontally and vertically.

According to one embodiment, the refreshing method includes conducting a first activating/detecting operation to the sensing area to obtain the first positional information. After the background signal of the refreshing area has been refreshed, the method includes conducting a second activating/detecting operation to the sensing area to obtain the second positional information.

According to one embodiment, after the second positional information is obtained from the second activating/detecting operation, the extension parameter is obtained based on the first and second positional information.

According to one embodiment, the extension parameter is obtained by: obtaining a first representative position based on the first positional information; obtaining a second representative position based on the second positional information; obtaining the extension parameter based on the first and second representative positions.

According to one embodiment, the extension parameter is vector-based and its direction is defined by pointing from the first to the second representative position. The magnitude thereof is directly proportional to the distance between the first and second representative positions.

The provided sensing device comprises a first sensing layer and a second sensing layer arranged in a stacked configuration. The first and second sensing layers jointly define a sensing area, which defines a plurality of sensing locations. The sensing device also comprises a sensing controller, which performs the following tasks: activating and detecting the sensing area; obtaining the positional information; obtaining a refreshing area based on the positional information, the extension parameter, and a measuring breadth; and refreshing a background signal of the refreshing area.

DETAILED DESCRIPTION

To begin with, it should be understood that a refreshing method of the instant disclosure for background signal is applicable to a sensing device capable of receiving positional information. The sensing device may be, but is not limited to, a touch screen, a digital drawing board, or a digital writing board. The embodiments provided hereinafter are in reference to a touch sensing device for explanatory purpose, but the scope of the instant disclosure is not limited thereto. For example, when the provided embodiments mention the act of touching, it would be achieved by a user's hand or a stylus if the sensing device is a touch screen. In the case of a digital drawing board, the act of touching is performed via a touch element, such as a digital pen. For others like a digital writing tablet, it can be touched by an input device such as a digital pen or the hand of a user.

It should also be noted that "positional information" described by the refreshing method, such as in step S50, is applicable to a touch sensing device. Therefore, the positional information may be, but is not limited to, touched coordinates. Meanwhile, touched coordinates may be, but not limited to, relative coordinates, absolute coordinates, or other information capable of showing any touched location. Furthermore, when the touch sensing device has been touched, the positional information is obtained by a host 30 or a processor 18. For the case of digital drawing or writing boards, the touch input means is not restricted. That is to say any input means corresponding to the applicable device is under the scope of "obtaining positional information" as described by the refreshing method of the instant disclosure.

Furthermore, for the following description, a light-permitting sensing device 10 is employed for explanatory purpose. However, the instant disclosure is not limited thereto. For example, if the refreshing method is applied to a digital drawing or writing board, the sensing device 10 may be non-light permitting.

Figure 1:
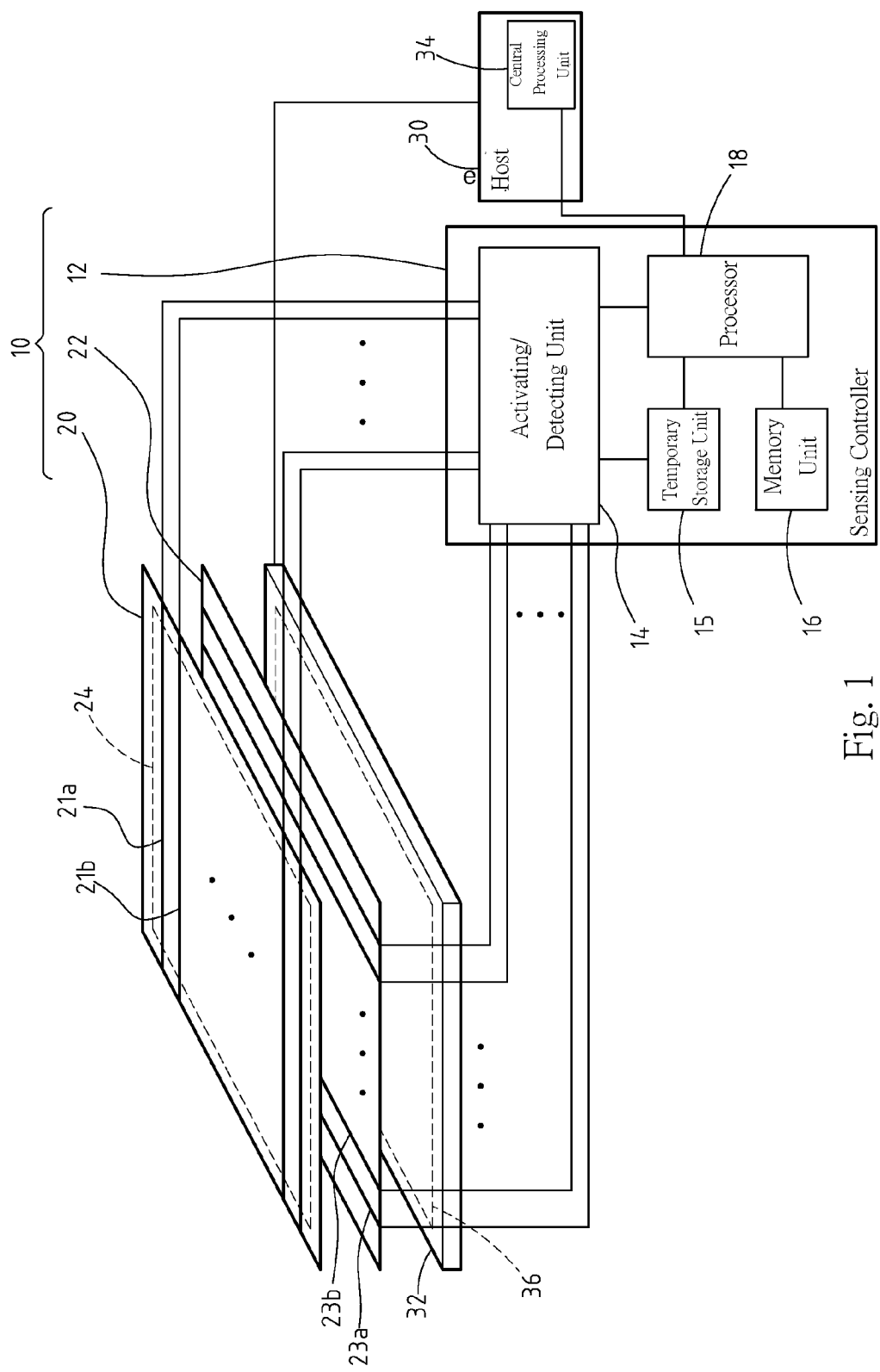
FIG. 1 shows a block diagram of a circuit for a sensing device of the touch screen of the instant disclosure.

Please refer to FIG. 1, which shows a block diagram of a circuit within the sensing device 10 of a touch screen of the instant disclosure. As can be seen, the touch screen comprises the sensing device 10, the host 30, and a display 32. The sensing device 10 includes a sensing controller 12, a first sensing layer 20, and a second sensing layer 22. For the instant embodiment, the sensing device 10 is a touch sensing device and the sensing controller 12 is a touch sensing controller, but both are not limited thereto.

More specifically, the first sensing layer 20 is stacked over the second sensing layer 22 with an electrically insulating layer (not shown), which may be sandwiched therebetween. For the instant embodiment, the first sensing layer 20 includes a plurality of first electrically conductive elements arranged in parallel and represented by the reference numerals 21a and 21b. Likewise, the second sensing layer 22 includes a plurality of second electrically conductive elements arranged in parallel and represented by the reference numerals 23a and 23b. As can be seen from a top view, the first electrically conductive elements 21a and 21b and the second electrically conductive elements 23a and 23b together define a plane coordinate system. For the instant embodiment, a Cartesian coordinate system is provided, but is not limited thereto. Alternatively, a polar coordinate system or some other plane coordinate system may be used. The intersecting points defined by the overlapping of the first electrically conductive elements 21a and 21b and the second electrically conductive elements 23a and 23b may represent the aforementioned sensing positions.

The conductive elements 21a, 21b, 23a, and 23b mentioned above have bar-type geometry, but are not restricted thereto. Meanwhile, the overlapping of these conductive elements can form a diamond shaped pattern, if seen from a top view. Further yet, all of the conductive elements may all be arranged coplanarly on a single sensing layer.

The display 32 is disposed underneath the second sensing layer 22. With the first and second sensing layers 20 and 22 being transparent or semi-transparent, when the display 32 is showing visual information, the user may see through the first and second sensing layers 20 and 22 to view the content. That is to say the light emitted from the display 32 can be projected through the first and second sensing layers 20 and 22 in reaching the eyes of the viewer. As mentioned earlier, when the refreshing method of the instant disclosure is applied to a digital drawing board, a digital writing board, or some other device, the first and second sensing layers 20 and 22 may be neither transparent nor semi-transparent.

When the touch sensing device is in operation, the host 30 utilizes the display 32 to present the content intended for the user. When the user makes a touch to the sensing device 10, the touched coordinates are transmitted by the sensing device 10 back to the host 30, for further processing by a central processing unit (CPU) 34 embedded in the host 30. The processing is dependent on the software application that corresponds to the display position identified by the touched coordinates on the display 32. For example, the CPU 34 may initialize a particular software application to display an icon of the digital pen, etc. The area of the display 32 for showing the content is typically referred to as an active area (AA) 36, which corresponds to the sensing area 24. The sensing area 24 is capable of detecting whether the user has made a touch to the sensing device 10 or not.

Next, the sensing controller 12 includes an activating/detecting unit 14, a memory unit 16, and a processor 18. The activating/detecting unit 14 includes an activating element and a detecting element. Both elements can be integrated into a single element or kept separate, depending on design preference.

To detect a user's touch, the sensing controller 12 may utilize self-capacitance or mutual capacitance method. For self-capacitance method, the processor 18 controls the activating/detecting unit 14 to activate the first electrically conductive elements 21a and 21b in sequence and then detect the same. Nevertheless, this activation/detection procedure could begin with the second electrically conductive elements, like 23a and 23b, instead. During the above operation, the activating/detecting unit 14 may activate one of the first electrically conductive elements, like 21a, and then detects the self-capacitance of this conductive element. The detection of self-capacitance may be based on measuring the time-to-charge-to-set-voltage (TCSV) or the voltage-after-charging-for-a-set-time (VACST). It should be understood that the measurement of self-capacitance refers to the activating/detecting unit 14 activating and detecting one of the first electrically conductive elements, such as 21a or 21b, or one of the second electrically conductive elements, such as 23a or 23b, in a given time period. Thus, when a change in capacitance is detected, the detection is indicating the capacitance value for one of the first electrically conductive elements, such as 21a or 21b, or one of the second electrically conductive elements, such as 23a or 23b, has changed. However, this change in the capacitance value of a single electrically conductive element is only suggesting that a particular horizontal position or vertical position has been touched, rather than a specific point.

Alternatively, for measuring mutual capacitance, the first electrically conductive element, such as 21a, and the second electrically conductive element, such as 23a, are selected for activation and detection by the activating/detecting unit 14. In this manner, the measured mutual capacitance value is for the selected first electrically conductive element 21a and the second electrically conductive element 23a. Thus, the detected mutual capacitance value corresponds to a specific point within the coordinate system. That is to say if a mutual capacitance value has changed, it can be determined that a specific point within the coordinate system has been touched. This measurement method normally, but is not limited thereto, first measures the mutual capacitances at the intersection points between one particular first electrically conductive element, such as 21a, and each of the second electrically conductive elements in sequence. Like measurements are performed for another first electrically conductive element, such as 21b, in an identical fashion until all of the intersection points within the coordinate system have been measured. The above described procedure is only for a single pass of the sensing layer. When the sensing device 10 is in use, the activating and detecting operations are to be repeated continuously.

Notably, the activation and detection of the conductive elements may be carried out by way of number counting. That is, the first conductive elements can be individually indexed 1, 2, 3, 4, and so forth, starting from one side of the sensing device 10 and progressing toward the opposite side thereof. Based on the assigned index value, the conductive elements for activation/detection can be count by ones, such as 1, 2, 3, and so forth. Another approach is to count by twos such as 1, 3, 5, and so forth. In such scenario, after the odd-indexed conductive elements have been activated and detected, the even-indexed conductive elements such as 2, 4, 6, and so forth can undergo activation and detection, until all of the conductive elements within a sensing layer have been activated and detected in a single pass.

It should be noted that only one conductive element is subjected to activation and detection at a time in the above-described operation. However, in practice, all or some of the conductive elements may be activated simultaneously and followed by simultaneous detection of activated conductive elements. For example, the odd-indexed conductive elements, such as 21a, can be activated simultaneously for simultaneous detection. Then, the even-indexed conductive elements like 21b would be up next. By doing so, the activation/detection time for a single pass can be reduced significantly.

Furthermore, the measured self-capacitance or mutual-capacitance is the capacitance of that horizontal or vertical coordinate (for the ease of explanation, "coordinate" is used hereinafter but is not restricted thereto). To determine if there is a change in capacitance, the measured capacitance needs to be compared to an original value. The original capacitance value may be a pre-determined capacitance value set by the manufacturer for an untouched state. Alternatively, the original capacitance value may be an adjusted value that is ambient-dependent for an untouched state. For example, when the ambient temperature or the static electricity has changed, the self or mutual capacitance of an entire or a specific area of the sensing device would change correspondingly in real-time. Since the user has yet to touch the sensing device, to prevent being touched accidentally, the processor 18 would update the untouched capacitance value in real-time. If the updating speed is not fast enough, when the user has touched the sensing device at multiple locations or drawn a line continuously, the response time of the sensing device would be slow or the line would be poorly drawn with broken marks.

Figure 2:
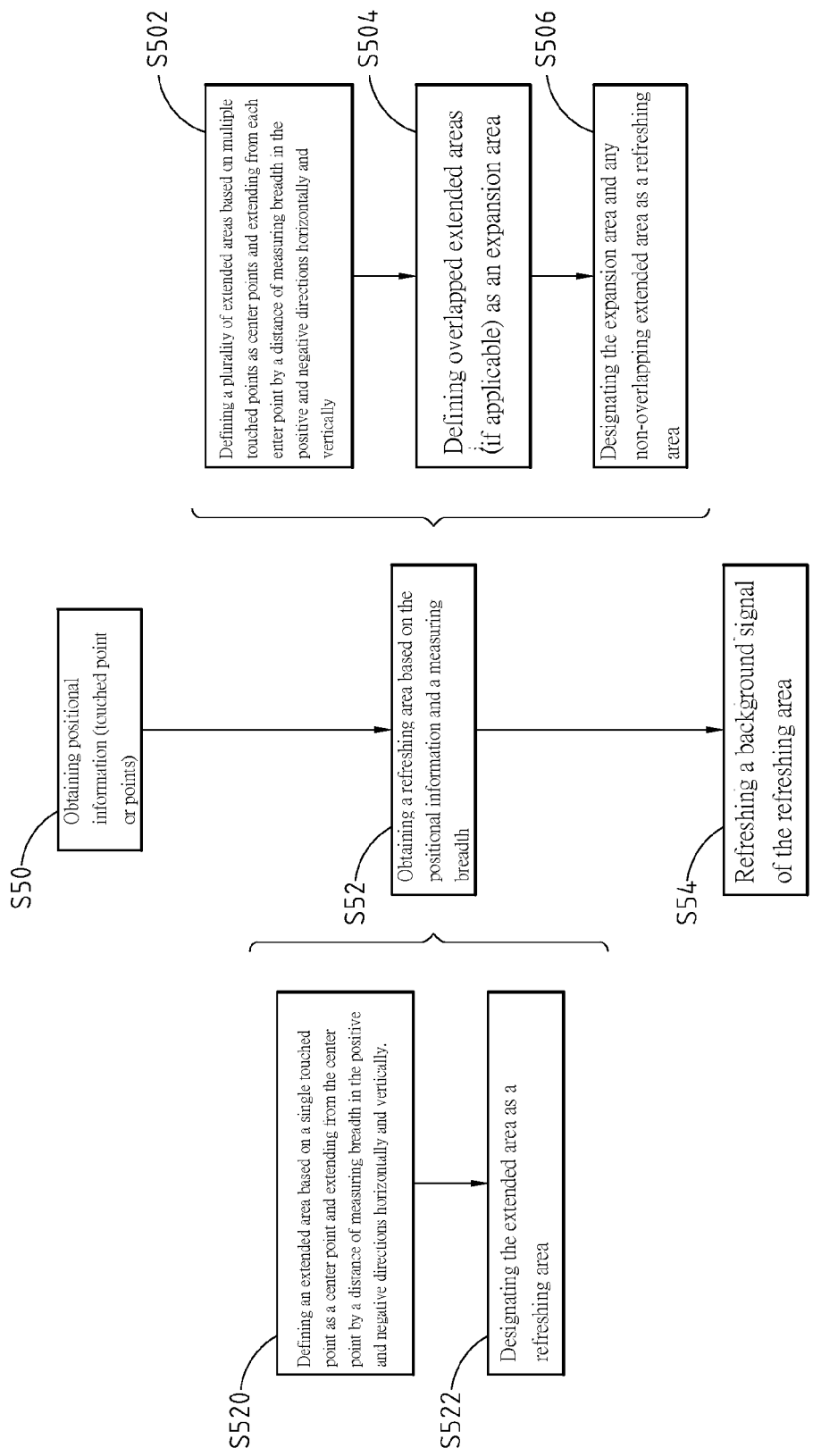
FIG. 2 shows a flow chart of a refreshing method of background signal of the sensing device of the instant disclosure.

Please refer to FIG. 2 in conjunction with FIG. 1, with FIG. 2 showing a flow chart of the refreshing method of background signal of the instant disclosure. The flow chart shows the following steps of the refreshing method:

Step S50: obtaining positional information;

Step S52: obtaining a refreshing area based on the position information and a measuring breadth; and Step S54: refreshing a background signal of the refreshing area.

The preceding method is applicable to a device capable of receiving position information.

For step S50, the processor 18 commands the activating/detecting unit 14 to activate and detect the sensing area 24 of the sensing device 10. The activation/detection is for a single pass to collect the capacitance of each coordinate pairs. Next, the processor 18 compares the detected capacitance values to the background signal value stored in the memory unit 16 to obtain the differences. When the difference for any coordinate pair is greater than a pre-determined threshold value, the processor 18 will recognize such coordinate pair as a touched point and transfer its information to the host 30. The transferred information is taken as the positional information, which includes at least the coordinates of the touched point, and the coordinates may be absolute coordinates, relative coordinates, or some other information capable of showing the touched position. In order to better understand the embodiments provided hereinafter, some corresponding descriptions would use touched coordinates directly to describe the positional information, but the "positional information" is not restricted thereto.

The act of determining if the aforementioned difference value is greater than the threshold value is not restricted to the processor 18. This task may also be carried out by the host 30 after receiving the difference value from the processor 18.

For one embodiment, the received positional information may be of a single touched coordinate pair or multiple pairs. The multiple coordinate pairs could be adjacent to one another within a specific area (e.g., one user finger made multiple touch inputs at different locations within a touch area, and all of the capacitance changes are greater than the threshold value). Alternatively, the positional information may include two or more groups of coordinates not adjacent to one another (a single coordinate group means a collection of adjacent coordinate pairs). This situation normally happens when the user uses two fingers simultaneously in making the input within the sensing area 24. More information regarding the single and multiple inputs are provided hereinbelow.

Figure 3:
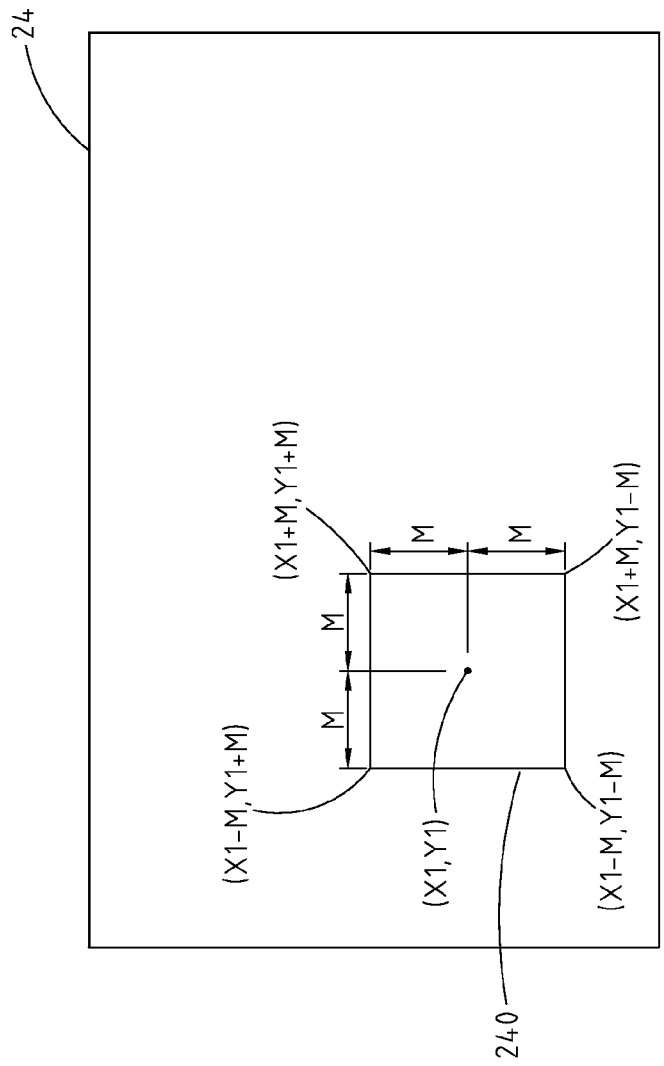
FIG. 3 is a schematic view of an extended area of a single touched point for the instant disclosure.

Starting with step S50 in which the positional information for only one touched point is received, and please refer to FIG. 3 in conjunction. FIG. 3 is a schematic view showing an extended area of the touched point. The received positional information is for a point having a coordinate pair (X1, Y1). Then, step S52 is performed in obtaining a refreshing area 240 based on the positional information and a measuring breadth M. More specifically, in step S502, with the coordinate pair (X1, Y1) being the center, the extended area is defined by extending horizontally and vertically from the center in both positive and negative directions by the measuring breadth M. In other words, the refreshing area 240 is an extended area defined with the coordinate pair (X1, Y1) and extended by the measuring breadth M therefrom horizontally and vertically in both positive and negative directions. The measuring breadth M is defined by dividing a predetermined movement speed V by a measuring sampling rate K, that is M=V/K. The movement speed V may be the maximum speed of the moving hand, with the movement speed V ranging from, but is not limited to, 50 to 90 cm/s. In practice, if the sensing device 10 has a relatively high surface friction, the predetermined movement speed V may be set to a smaller value. Conversely, for smaller surface friction, the predetermined movement speed V should be set to a higher value. Study reports have suggested the maximum speed of a moving hand is substantially 76 cm/s, but is not limited thereto and will vary depending on the type of the sensing device. The unit of the measuring sampling rate K is Hertz (Hz), which indicates the number of activation/detection/refreshing operations completed by the sensing device in a time period of one second (i.e., frequency). The measuring sampling rate K is related to the software, firmware, and hardware of the sensing device. Although the measuring breadth M has been defined as above, it is not restricted thereto and may be adjusted according to the actual operation.

In the above discussion, the multi-directional extension is based on a right-angled coordinate system. That is to say the positive and negative horizontal directions refer to the positive and negative directions of the x-axis, and the positive and negative vertical directions are referring to the positive and negative directions of the y-axis. Therefore, the extended area is represented by the rectangular illustration having coordinate pairs of (X1−M, Y1−M), (X1−M, Y1+M), (X1+M, Y1+M), and (X1+M, Y1−M). For example, if (X1, Y1) corresponds to (380, 160) and the measuring breadth M is equal to 40 grid points, then the extended area is defined by the coordinate pairs (340, 120), (340, 200), (420, 200), and (420, 120).

Once the extended area has been defined, it is designated as the refreshing area 240 (step S522). Thus, the processor 18 will only refresh the background signal of the refreshing area 240, not the entire sensing area 24, hence reducing the refreshing time while increasing efficiency. Secondly, since the refreshing area is defined by the positional information and the measuring breadth M, with the measuring breadth M already incorporating the maximum speed of the user hand, the sensing device 10 can still track successfully without breaking a continuous line even when the user hand is moving very fast over the sensing area 24. The "refreshing" mentioned herein may be the act of saving, done by the processor 18, of the background signal read by the activating/detecting unit 14, to the memory unit 16.

The following description shall discuss the positional information for multiple point locations. First, a single group having coordinate pairs adjacent to one another is termed as a position information group. The term "adjacent" herein may be defined as two or more points next to each other spaced by minimum grid resolution in a grid system. An alternative definition may be the distance between adjacent points being substantially less than or equal to the measuring breadth M, or further still being substantially less than or equal to two times the measuring breadth M. Further details regarding the above definitions are provided hereinbelow.

Figure 4A:
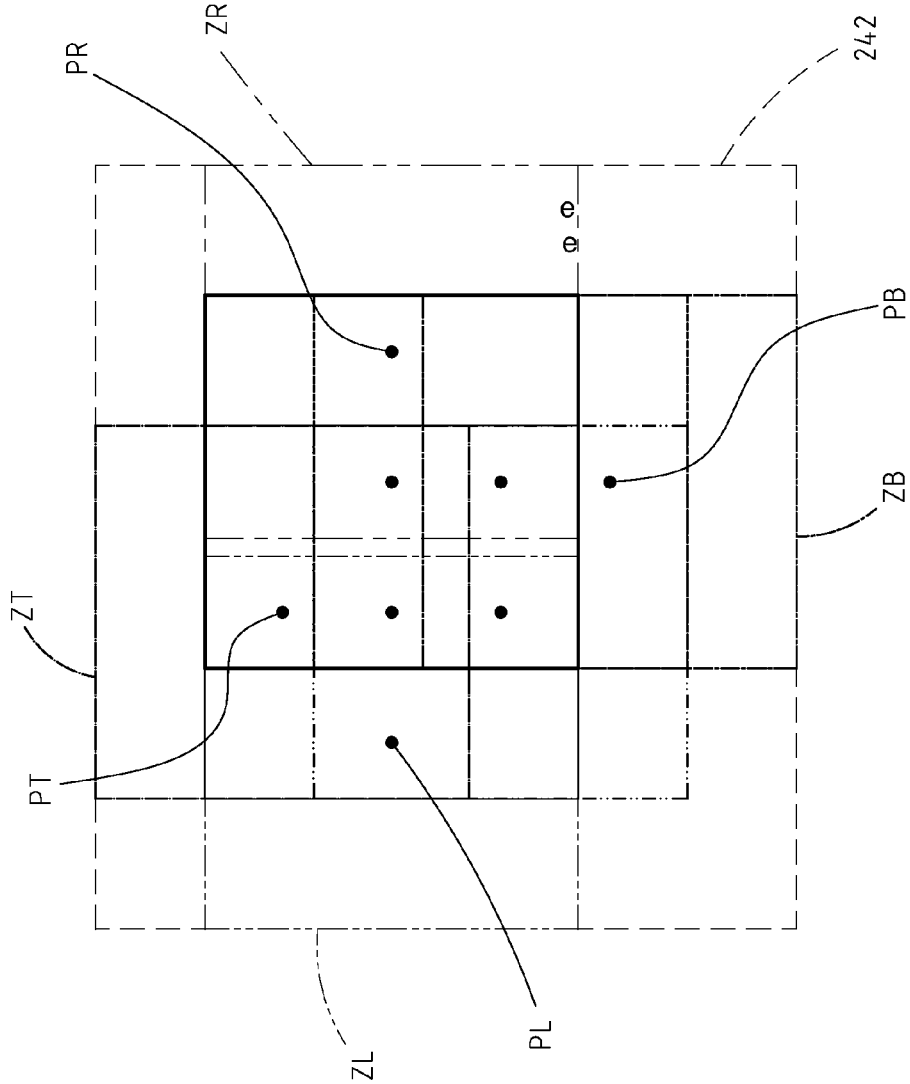
FIG. 4A is a schematic view of multiple extended areas for multiple touched points for a first embodiment of the instant disclosure.

Please refer to FIGS. 2 and 4A, with FIG. 4A being a schematic view for a first embodiment of the extended area of a position information group.

Based on FIG. 2, it can be known that upon receiving the positional information for multiple touched points, the following steps are executed sequentially starting with step S502: extending horizontally and vertically in both positive and negative directions by a measuring breadth from the center of each touched point to define a plurality of extended areas;

Step S504: designating an expansion area that includes overlapping extended areas; and Step S506: designating the expansion area and the non-overlapped extended area as the refreshing area.

From FIG. 4A, it can be seen the received positional information including eight touched points, with the right-most, left-most, top-most, and bottom-most points being named PR, PL, PT, and PB, respectively. These touched points exhibit the "adjacent" relationship separated by the minimum grid resolution therebetween. After step S502 has been implemented, eight extended areas are defined with overlapping characteristic. The right-most, left-most, top-most, and bottom-most extended areas are labeled as ZR, ZL, ZT, and ZB, respectively. When executing step S506, the processor 18 designates an expansion area 242 based on the overlapped extended areas. The extent of the expansion area 242 is defined by the right border of the extended area ZR, the left border of the extended area ZL, the top border of the extended area ZT, and the bottom border of the extended area ZB.

It should be noted that for the embodiment shown in FIG. 4A, there is no non-overlapping extended area. Thus, for step S506, the above mentioned expansion area 242 is taken as the refreshing area. That is to say the processor 18 will refresh the background signal of the refreshing area only. Hence, the sensing device 10 does not have to refresh the entire sensing area 24, thus the refreshing time can be reduced with increased efficiency.

Figure 4B:
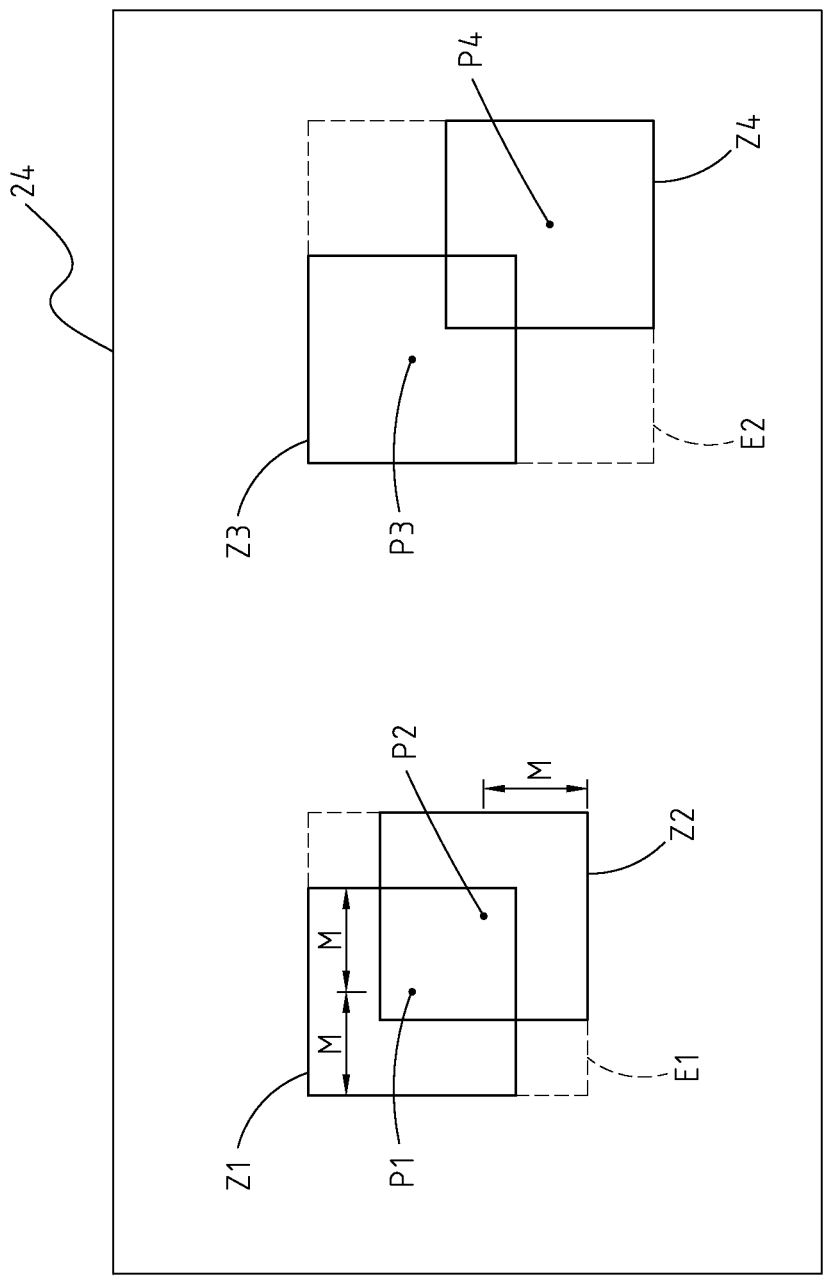
FIG. 4B is a schematic view of multiple extended areas for multiple touched points for a second embodiment of the instant disclosure.

Next, please refer to FIG. 4B, which is a schematic view showing a second embodiment of the extended areas of the positional information. It can be seen from the left side of the figure, two touched points P1 and P2 are separated by a distance of less than the measuring breadth M. While on the right side of the figure, the two touched points P3 and P4 are separated by a distance of less than two times the measuring breadth M. However, it should be understood that the above conditions are not restrictive. After the processor 18 has carried out step S502, the resulting four extended areas Z1, Z2, Z3, and Z4 are obtained, with Z1 and Z2 being overlapped, and Z3 and Z4 being overlapped. Thus, after the processor 18 has performed step S504, two expansion areas E1 and E2 are obtained. Next, the processor 18 executes step S506 to designate the expansion areas E1 and E2 as the refreshing areas. The processor 18 then refreshes the background signals of the designated refreshing areas in step S54.

It should be noted that for the two extended areas Z3 and Z4 (the distance between points P3 and P4 is substantially greater than the measuring breadth M but substantially less than two times thereof), in practice, may be defined as a single expansion area or otherwise depending on the actual operation without restriction.

Figure 5:
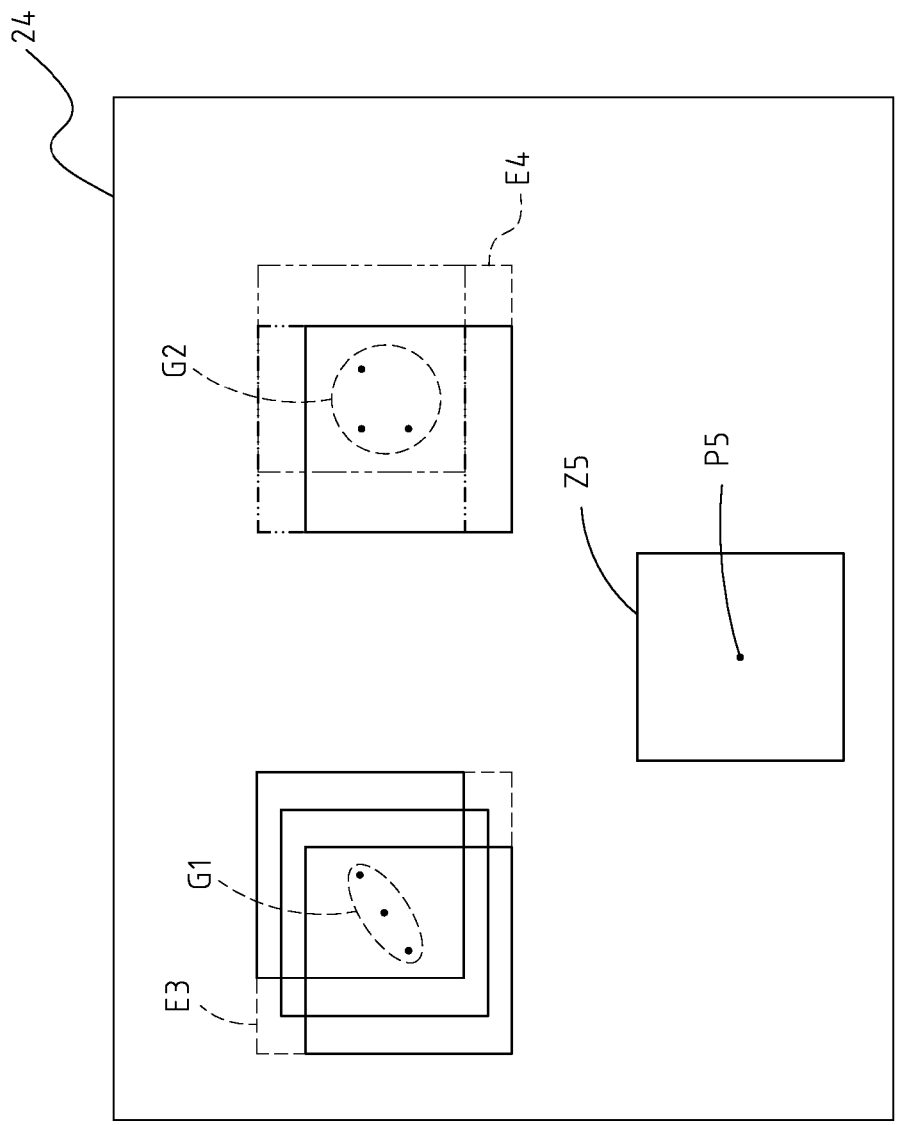
FIG. 5 is a schematic view of an expanded area and extended areas for a first embodiment of the instant disclosure.

Next, please refer to FIG. 5 in conjunction with FIG. 2. FIG. 5 is a schematic view showing a first embodiment of the expansion and extended areas of the positional information.

Based on FIG. 5, the received positional information includes two coordinate groups G1 and G2 and a single touched point P5. After step S504 has been implemented, two expansion areas E3 and E4 are obtained from the coordinate groups G1 and G2, while an extended area Z5 is defined from the touched point P5. Next, when implementing step S506, the expansion areas E3 and E4 and the extended area Z5 are designated as a single refreshing area whose background signal will be refreshed by the processor 18.

Figure 6:
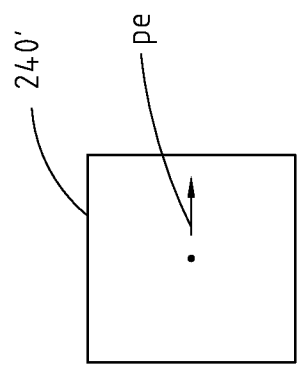
FIG. 6 is a schematic view of an expanded area and an extended area for a second embodiment of the instant disclosure.
Figure 7:
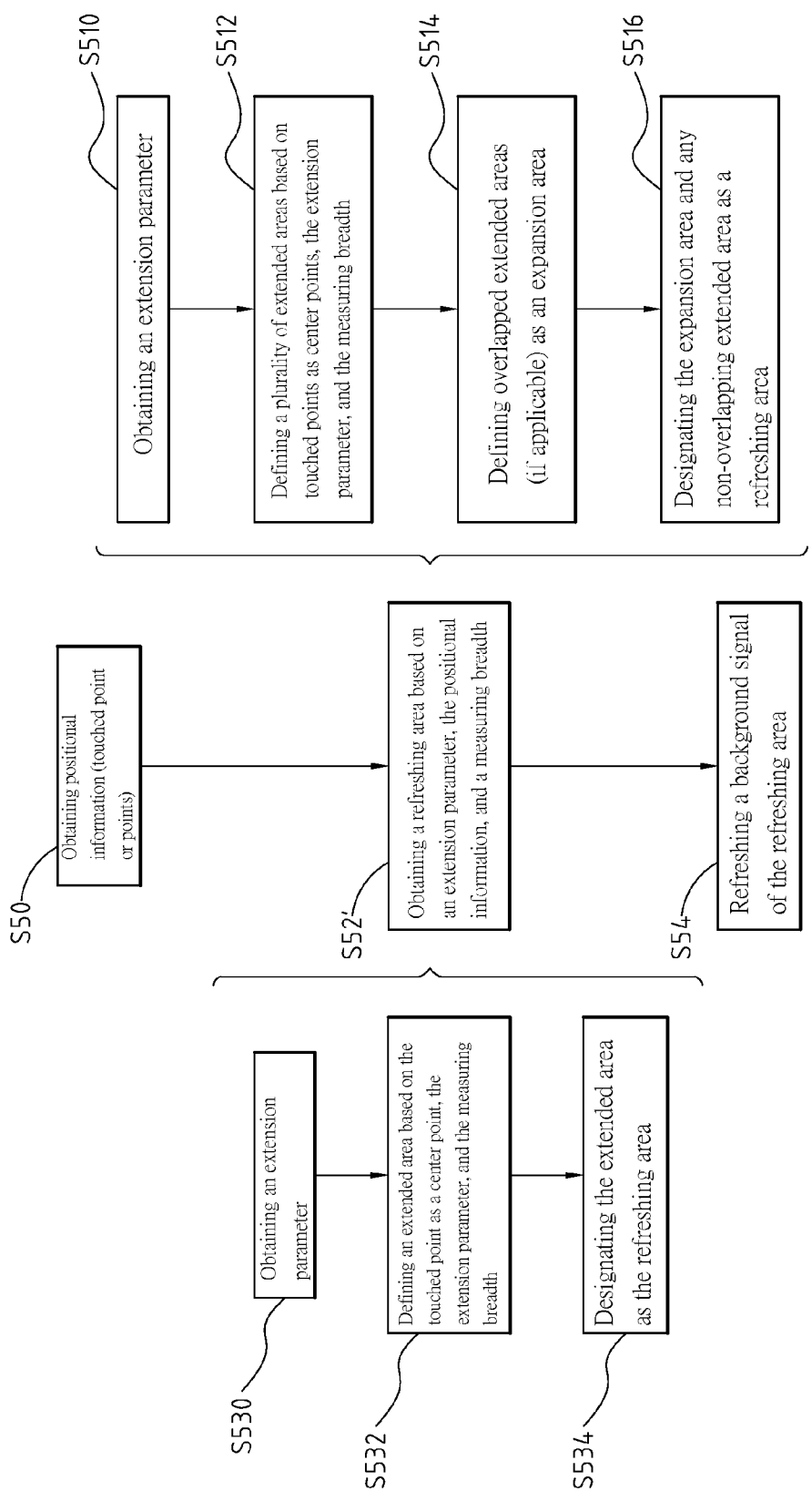
FIG. 7 is a flow chart for the embodiment shown in FIG. 6.

For another embodiment of the instant disclosure, please refer to FIGS. 6 and 7. FIG. 6 illustrates a schematic view of a second embodiment of the expansion and extended areas of the position information group, while FIG. 7 shows a corresponding flow chart. For this embodiment, the moving direction and speed of the touch motion by the user are considered, and the refreshing method includes:

Step S50: receiving positional information;

Step S52': obtaining a refreshing area based on an extension parameter pe, the positional information, and a measurement breadth; and Step S54: refreshing a background signal of the refreshing area.

In step S50, if the received positional information includes multiple touched points, step S52' can be further divided into the following steps:

Step S510: receiving the extension parameter pe;

Step S512: defining a plurality of extended areas based on the extension parameter pe and the measuring breadth, with each touched point being the center;

Step S514: defining the overlapped extended areas as the expansion area; and Step S516: designating the expansion area and any non-overlapping area as the refreshing area.

The extension parameter pe may correspond to the velocity (speed and direction) of a user operated stylus. Thus, the processor 18 may anticipate the possible moving direction of the stylus, such as moving in the positive horizontal direction at certain speed. Hence, when designating the extended area, the extent of extension in the positive horizontal direction may be adjusted based on the speed and the measuring breadth, while the extent of extension in the negative horizontal direction may be slightly lessened (can not have zero extension in the negative direction, since the user may move in the opposite direction), as shown by the extended area 240' in FIG. 6. Since steps S512, S514, and S516 are similar to aforementioned steps S502, S504, and S506, no further elaboration will be given herein.

There are several ways to set the extension parameter pe. For example, the extension parameter pe may be a fixed value or related to the moving speed of the stylus. If it is a fixed value, this extension parameter pe may be set as the maximum speed or average moving speed of the user's hand, stylus, or touch input device over the sensing device 10.

Furthermore, when the sensing device 10 is in a detecting state and yet touched by the user (referred hereinafter as the "standby mode"), the extension parameter pe may be set to a value of "0", "1" (will be used for discussion), or "null". That is, the sensing device 10 is yet to receive the traces of a stylus, thus it is not necessary to anticipate the moving speed and direction of the stylus, and would be appropriate to set the extension parameter pe at an initial value of "1".

When the sensing device 10 is on standby, the sensing area 24 will be continuously activated and detected. If the positional information (single or multiple touched locations) is obtained during a particular activation and detection operation (step S50), steps S52' and S54 will be performed. For the embodiment represented by FIGS. 6 and 7, in step S50, positional information of multiple touched points are received (the embodiment for a single touched point will be discussed later), while steps S510, S512, S514, and S516 are derived from step S52'. When the sensing device 10 is in the standby mode and after it has received the positional information for the first time (also referred to as "first positional information"), and because the extension parameter pe is at a value of "1", step S512 would be equivalent to step S502, which is "defining a plurality of extended areas by extending from each of the touched points by the measuring breadth in both positive and negative directions horizontal and vertically." Next, after steps S514, S516, and S54 have been completed, the sensing device 10 would execute next (second) round of activation/detection and repeat steps S52' and S54 sequentially. At this stage, the extension parameter pe remains being "1".

During the second round of activation/detection, if the sensing device 10 does not receive any positional information (i.e., no occurrence of a touch input), the extension parameter pe would remain at the value of "1" and the sensing device 10 would remain on standby (i.e., activating/detecting continuously). However, if the sensing device 10 does pick up positional information (also referred to as "second positional information) during the second round of activation/detection (i.e., step S50), the extension parameter pe can be set by the sensing device 10 according to the first and second positional information (to be referred to as "continuous positional information" hereinafter). It should be understood that the continuous positional information is referring to the information obtained from a previous and a next activating/detecting operations, rather than continuous information obtained from a single activating/detecting operation.

The content associated with the continuous positional information may be classified into four categories: 1) a single touched point from each of the first and second rounds of activation/detection; 2) a single touched point from the first round of activation/detection and multiple touched points from the second round of activation/detection; 3) multiple touched points from both first and second rounds of activation/detection; and 4) multiple touched points from the first round of activation/detection and a single touched point from the second round of activation/detection. The extension parameter pe is obtainable regardless of which category.

When positional information of multiple touched points are obtained, the multiple touched points may be converted to a representative position. For instance, the representative position may be a geometric center of the multiple touched points or a coordinate pair constitutes a horizontal coordinate that occurs most frequently and a vertical coordinate that occurs most frequently (i.e., the mode). If the obtained positional information is of a single touched point, the representative position would be the single touched point as is.

When the representative positions of the first and second rounds of activation/detection become available, the resulting extension parameter pe may be obtained. The extension parameter pe may be a vector defined by the first and second representative positions. When put to use in step S512, which is "defining a plurality of extended areas based on the extension parameter, the measuring breadth, and touched (representative) points as center points", the distance extended along the same direction of the vector is greater than the distance extended at an opposite direction to that of the vector. For example, when the extension parameter pe is at a value of "1", each of the distances extended in both positive and negative horizontal and vertical directions is equivalent to the measuring breadth. However, when the extension parameter pe is a vector and assuming the vector is pointing in the positive horizontal direction (+X), the distance extended from the center toward the positive horizontal direction would be greater than the measuring breadth, and the distance extended from the center toward the negative horizontal direction (−X) would be less than the measuring breadth. In addition, since the vector is directed toward the positive horizontal direction, the distance extended in the vertical direction would remain the same, that is, equivalent to the measuring breadth. Alternatively, if the vector is raised at an angle of 45 degrees from the positive horizontal direction, each of the distances extended along the positive horizontal direction (+X) and the positive vertical direction (+Y) would be greater than the measuring breadth. While in the negative horizontal direction (−X) and vertical direction (−Y), each of the distances extended is less than the measuring breadth, and so forth.

In the above paragraph, for the statement "the distance extended along the same direction of the vector is greater than the distance extended at an opposite direction to that of the vector", the difference in the distance extended may be related to the magnitude of the vector. As the magnitude increases, the difference ratio also increases. Conversely, the difference ratio decreases as the magnitude decreases. For the ease of calculation, the magnitude of the vector may be compared to a predetermined value to obtain a resulting ratio. Hence, the distance to be extended may be obtained by multiplying or dividing the measuring breadth M by this ratio. The predetermined value may be the maximum speed of movement by a user's hand over the sensing device 10.

It can be known from the above that the extension parameter pe may be related to the first and second representative positions. That is, the magnitude of the vector is dependent of the distance between the first and second representative positions, while the direction of the vector is the direction from the first to second representative position; and the extension parameter pe is related to the vector, with the magnitude of the extension parameter pe being directly related to the magnitude of the vector.

The above-described embodiment is based on multiple touched points for refreshing the background signal. In the case that the first and/or second round of activation/detection yields the positional information for only a single touched point, steps similar to S520 and S522 may be adopted. That is, as shown in FIG. 7, step S530 ("obtaining the extension parameter"), step S532 ("defining an extended area based on the extension parameter, the measuring breadth, and the touched point as the center point"), and step S534 ("designating the extended area as the refreshing area") are utilized to obtain the refreshing area. For this scenario (single touched point), the extension parameter pe can be obtained as described before, thus will not be further elaborated.

Therefore, in order to accommodate both embodiments (single vs. multiple touched points), step S52 ("obtaining a refreshing area based on positional information and a measuring breadth") may be modified to "obtaining a refreshing area based on an extension parameter, the positional information, and a measuring breadth" (step S52'). Thus, the four categories of the continuous positional information may be included.

The refreshing method of background signal of the instant disclosure is executed by the sensing controller 12 of the sensing device 10. For example, the sensing controller 12 utilizes the processor 18 to control the activating/detecting unit 14, in order to obtain positional information during a single round of activation/detection. Then, the processor 18 can perform steps S52 and S54. It should be remembered that for a single touched point, step S52 is subdivided into steps S520 and S522. For multiple touched points, step S52 is subdivided into steps S502, S504, and S506 instead. If the extension parameter pe is to be considered, step 52 will be replaced by step S52' and its associated steps shown in FIG. 7.

Before step S50 is implemented (i.e., standby mode), the first and second sensing layers 20 and 22 are implicitly activated and detected continuously by the host 30. That is, the host 30 instructs the processor 18 to carry out activation/detection for the sensing layers 20 and 22. More specifically, the processor 18 controls the activating/detecting unit 14 to activate and detect the first and second sensing layers 20 and 22, in order to obtain a measured capacitance value. The processor 18 then proceeds to compare the measured capacitance value with the predetermined threshold value stored in the memory unit 16. If the processor 18 determines that a touch input has not occurred, the sensing device 10 will continue its activating/detecting operation. However, if the processor 18 does determine that a touch input has occurred, the processor 18 will be obtaining the positional information (step S50) of the touched point or points. Then, subsequent steps will be carried out as follow: the processor 18 sets the refreshing area and saves the setting in a temporary storage unit 15 (step S52); and the processor 18 re-obtains the background signal and refreshes the saved background signal in the memory unit 16 (step S54).

Nevertheless, the host 30 is also capable of storing the background signal. The processor 18 may obtain the background signal from the host 30 and store it in the temporary storage unit 15. Then, in step S54, the stored background signal in the temporary storage unit 15 is refreshed by the processor 18. In another scenario, the background signal is stored in the host 30. After the processor 18 has set the refreshing area and saves the setting in the temporary storage unit (step S52), the processor 18 will only convert the input touch signal to the positional information and transfer it to the host 30. Then, the host 30 will refresh the background signal stored in the memory unit 16 (step S54).

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A refreshing method of background signal, applicable to a sensing device capable of receiving positional information, comprising:
obtaining positional information based on a determination that a threshold value with respect to a first background signal value is breached, wherein the first background signal value corresponds to a first portion of the sensing device;
obtaining a refreshing area based on the positional information, an extension parameter, and a measuring breadth, the refreshing area comprising at least one of the first portion of the sensing device or the first portion of the sensing device and one or more other portions of the sensing device; and
refreshing a background signal of the refreshing area
wherein
the first background signal value is stored in a memory associated with the sensing device;
one or more other background signal values corresponding to the one or more other portions of the sensing device are stored in the memory, and
refreshing the background signal comprises updating only the background signal values corresponding to the portions of the sensing device included in the refreshing area.

2. The refreshing method of claim 1, wherein the positional information is a plurality of touched points, while the refreshing area is obtained by:
obtaining the extension parameter;
defining a plurality of extended areas with the touched points as center points and based on the extension parameter and the measuring breadth;
defining overlapped extended areas as an expansion area; and
designating the expansion area and any non-overlapping extended area as the refreshing area.

3. The refreshing method of claim 2, wherein when the sensing device is in a standby mode, the extended areas are defined with extending from respective center points by a distance of measuring breadth in the positive and negative directions horizontally and vertically.

4. The refreshing method of claim 3, wherein the extension parameter is set to a value of "1" when the sensing device is in the standby mode.

5. The refreshing method of claim 2, wherein the sensing area undergoes a first activating/detecting operation to obtain the first positional information, and wherein the sensing area undergoes a second activating/detecting operation after the background signal of the refreshing area has been refreshed to obtain the second positional information.

6. The refreshing method of claim 5, wherein after the second positional information is obtained by the second activating/detecting operation, the extension parameter is obtained based on the first and second positional information.

7. The refreshing method of claim 6, wherein the extension parameter is obtained by:
obtaining a first representative position based on the first positional information;
obtaining a second representative position based on the second positional information; and
obtaining the extension parameter based on the first and second representative positions.

8. The refreshing method of claim 7, wherein the extension parameter is vector-based and has a direction pointing from the first to second representative position, and wherein the magnitude of the extension parameter is directly proportional to the distance between the first and second representative positions.

9. The refreshing method of claim 8, wherein the expansion area is defined by the maximum and minimum horizontal and vertical coordinates of the overlapped extended areas.

10. The refreshing method of claim 9, wherein the measuring breadth is obtained by dividing a predetermined movement speed by a measuring sampling rate.

11. The refreshing method of claim 10, wherein the predetermined movement speed is in the range of 50 to 90 cm/s.

12. The refreshing method of claim 1, wherein the positional information is a single touched point, while the refreshing area is obtained by:
obtaining the extension parameter;
defining an extended area with the touched point as center point and based on the extension parameter and measuring breadth; and
designating the extended area as the refreshing area.

13. The refreshing method of claim 12, wherein when the sensing area is in a standby mode, the extended area is defined by extending from the center point by a distance of the measuring breadth in both positive and negative directions horizontally and vertically.

14. The refreshing method of claim 13, wherein the sensing area undergoes a first activating/detecting operation to obtain the first positional information, wherein the sensing area undergoes a second activating/detecting operation after the background signal of the refreshing area has been refreshed to obtain the second positional information, and wherein after the second positional information is obtained by the second activating/detecting operation, the extension parameter is obtained based on the first and second positional information.

15. The refreshing method of claim 14, wherein the extension parameter is vector-based and has a direction pointing from the touched point of the first positional information to another touched point of the second positional information, and wherein the magnitude of the extension parameter is directly proportional to the distance between the touched points defined by respective positional information.

16. A sensing device, comprising:
a first sensing layer and a second sensing layer arranged in a stacked configuration, a sensing area defined jointly by the first and second sensing layers, a plurality of sensing positions being defined within the sensing area; and
a sensing controller capable of activating and detecting the sensing area, obtaining positional information, obtaining a refreshing area based on the positional information, an extension parameter, and a measuring breadth, and refreshing a background signal of the refreshing area,
wherein
the sensing controller is configured to obtain the positional information based on a determination that a threshold value with respect to a first background signal value is breached, wherein the first background signal value corresponds to a first position coordinate of the plurality of position coordinates, the refreshing area comprises at least one of the first position coordinate of the plurality of position coordinates or the first position coordinate of the plurality of position coordinates and one or more other position coordinates of the plurality of position coordinates, the first background signal value is stored in a memory associated with the sensing device;

one or more other background signal values corresponding to the one or more other position coordinates of the plurality of position coordinates are stored in the memory, and the sensing controller is configured to refresh the background signal by updating only the background signal values corresponding to the position coordinates included in the refreshing area.

17. The sensing device of claim 16, wherein the positional information is a plurality of touched points, while the refreshing area is obtained by:

obtaining the extension parameter;

defining a plurality of extended areas based on the extension parameter and measuring breadth;

defining overlapped extended areas as an expansion area; and designating the expansion area and any non-overlapping extended area as the refreshing area.

18. The sensing device of claim 17, wherein when the sensing device is in a standby mode, the extended areas are defined with extending from respective center points by a distance of measuring breadth in the positive and negative directions horizontally and vertically.

19. The refreshing method of claim 18, wherein the sensing area undergoes a first activating/detecting operation to obtain the first positional information, and wherein the sensing area undergoes a second activating/detecting operation after the background signal of the refreshing area has been refreshed to obtain the second positional information.

20. The refreshing method of claim 19, wherein after the second positional information is obtained by the second activating/detecting operation, the extension parameter is obtained based on the first and second positional information by:

obtaining a first representative position based on the first positional information;

obtaining a second representative position based on the second positional information; and obtaining the extension parameter based on the first and second representative positions.

21. The refreshing method of claim 20, wherein the expansion area is defined by the maximum and minimum horizontal and vertical coordinates of the overlapped extended areas, and wherein the measuring breadth is obtained by dividing a predetermined movement speed by a measuring sampling rate.

22. The sensing device of 21, wherein the predetermined movement speed is in the range of 50 to 90 cm/s.

23. The sensing device of claim 16, wherein the positional information is a single touched point, wherein the refreshing area is obtained by:

obtaining the extension parameter;

defining an extended area with the touched point as a center point and based on the extension parameter and measuring breadth; and designating the extended area as the refreshing area.

24. The sensing device of claim 23, wherein when the sensing area is in a standby mode, the extended area is defined by extending from the center point by a distance of the measuring breadth in both positive and negative directions horizontally and vertically.

25. The sensing device of claim 24, wherein the sensing area undergoes a first activating/detecting operation to obtain the first positional information, wherein the sensing area undergoes a second activating/detecting operation after the background signal of the refreshing area has been refreshed to obtain the second positional information, and wherein after the second positional information is obtained by the second activating/detecting operation, the extension parameter is obtained based on the first and second positional information.

26. The refreshing method of claim 23, wherein the extension parameter is vector-based and has a direction pointing from the touched point of the first positional information to another touched point of the second positional information, and wherein the magnitude of the extension parameter is directly proportional to the distance between the touched points defined by respective positional information.

* * * * *